Nov. 19, 1968  G. SCHULZ ETAL  3,412,102
PRODUCTION OF COPPER PHTHALOCYANINES
Filed June 22, 1966
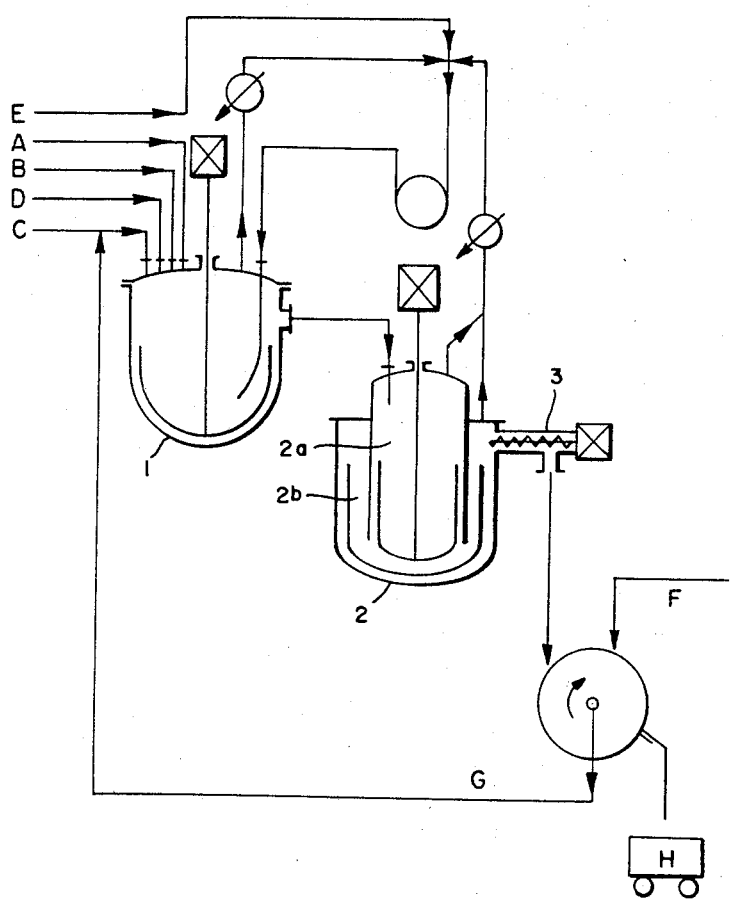
INVENTORS:
GERHARD SCHULZ
RUDOLF POLSTER
BY
Marzall, Johnston, Cook & Root
ATT'YS

United States Patent Office 3,412,102
Patented Nov. 19, 1968

3,412,102
PRODUCTION OF COPPER PHTHALOCYANINES
Gerhard Schulz, Ludwigshafen (Rhine), and Rudolf Polster, Frankenthal, Pfalz, Germany, assignors to Badische Anilin- & Soda-Fabrik Aktiengesellschaft, Ludwigshafen (Rhine), Germany
Filed June 22, 1966, Ser. No. 559,521
Claims priority, application Germany, June 25, 1965, B 82,552
10 Claims. (Cl. 260—314.5)

ABSTRACT OF THE DISCLOSURE

Production of a copper phthalocyanine by reaction of a phthalodinitrile with copper salts in an inert solvent and in the presence of ammonia or tertiary organic bases wherein the reaction is carried out at elevated temperatures up to about 220° C. and in the presence of specific molybdenum, iron and titanium catalysts. The copper phthalocyanine products are useful dyes obtained in excellent yields and very good purity.

---

This invention relates to a new method for the production of copper phthalocyanines.

It is already known from many patent specifications that copper phthalocyanines can be prepared from phthalodinitrile and copper salts in nitrobenzene as the solvent with the addition of ammonia. The methods described in the said patent specifications have not found any industrial use because, for example, either an autoclave is required for carrying out the reaction, the reaction period needed to achieve satisfactory yields is too long or the reaction products are not industrially useful until they have been subjected to a thorough and expensive purification.

We have now found that copper phthalocyanines are obtained in a rapidly proceeding reaction, in excellent yields and very good purity by reaction of phthalodinitrile with copper salts in solvents which are inert under the reaction conditions and in the presence of nitrogen bases at temperatures of up to 220° C., when the reaction is carried out in the presence of compounds, particularly oxides, oxygen acids or their salts, halides or carbonyl compounds of elements of main groups 4, 5, 6 and 8 or sub-groups 2, 4, 5 and 6, having atomic numbers from 22 to 42 inclusive.

Compounds of titanium, molybdenum or iron are particularly suitable as catalytically active compounds for use according to this invention. Of these, the carbonyl compounds of molybdenum or iron are particularly effective. The following specific compounds have catalytic activity: molybdenum oxide, molybdenum carbonyl, iron carbonyl, titanium tetrachloride, phosphomolybdic acid and molybdic acid.

Suitable catalysts are also complex compounds which contain an element having one or the said atomic numbers as the central atom, and complexes having other different central atoms which, in addition to an element having one of the abovementioned atomic numbers, also contain elements having other atomic numbers.

The metal chlorides may be completely chlorinated according to their valency stage or may be used as mixed salts or may be partly hydrolyzed.

Complex compounds having carbonyl ligands may be used as pure metal carbonyls, or part of the carbonyl groups may be replaced by other substituents.

Examples of solvents which are inert under the reaction conditions are aromatic compounds, such as monochlorobenzene, trichlorobenzene, and also octyl alcohol, nonyl alcohol, dodecyl alcohol and particularly nitrobenzene. Compounds having boiling points above 180° C. are preferred. Suitable copper salts are those usually employed for the production of copper phthalocyanine, such as copper sulfate, copper acetate and particularly copper (I) chloride and copper (II) chloride or mixtures of these salts.

Examples of nitrogen bases in whose presence the reaction is carried out are ammonia or organic bases, particularly tertiary organic bases, such as pyridine or quinoline. If tertiary bases are used, they may be used in excess and will then serve as solvents instead of the solvents mentioned above.

The phthalodinitrile may be not only the unsubstituted phthalodinitrile which is used on a large scale industrially, but substituted phthalodinitriles (which it is very difficult or impossible to convert into phthalocyanines by prior art methods) may also be used. Examples of substituted phthalodinitriles are halogenated phthalodinitriles, such as compounds chlorinated or brominated once to four times and particularly tetrachlorophthalodinitrile, and also phenyl substituted compounds, such as 4-phenylphthalodinitrile.

Since the process according to this invention leads to complete reaction in a very short time, i.e. in about ten to twenty minutes (as against ten to twelve hours in the prior art methods) it is outstandingly suitable for continuous production of copper phthalocyanines. The process may however be carried out as a batch method although the continuous method is preferred.

For example the procedure may be that a copper salt is suspended in an inert solvent and a nitrogen base, such as ammonia, passed in or added, the temperature rising by about 10° to 20° C. The phthalodinitrile and the catalyst are then added and the whole is heated with vigorous stirring to about 120° C. within a short time, so that most of the dinitrile passes into solution and a yellow intermediate is partly precipitated. The temperature of 120° C. is maintained for a short time, for example about ten minutes, and the whole is then heated quickly to a higher temperature, i.e., about 170° C., until the strongly exothermic reaction with the formation of copper phthalocyanine begins. The temperature rises sharply and the reaction is over after about ten to twenty minutes without further heating.

The ratio of copper salt to phthalodinitrile is advantageously kept stoichiometric as usual or the copper salt or dinitrile may be used in a slight excess, for example a 20% excess, of the stoichiometric amount.

The amount of nitrogen base to be used may vary within wide limits. For example the reaction mixture may be saturated with ammonia or only half of the amount required for saturation may be used. It is advantageous however to use at least 0.1 mole and not more than 2 moles of the nitrogen base with respect to the phthalodinitrile. When the nitrogen base serves at the same time as the solvent, however, a larger amount than the said maximum amount may be used. The amount of inert solvent may for example be twice to eight times the weight of the phthalodinitrile. It should advantageously be chosen so that the reaction mixture remains sufficiently mobile. Larger amounts than the eight-fold amount specified above are therefore not injurious but are generally not advisable because the reaction period is prolonged by the greater dilution.

The amount of the catalytically active compound used may be for example 0.1 to 2 moles to 1 mole of phthalodinitrile. Smaller amounts of catalyst than this also considerably accelerate the reaction, but substantially longer reaction periods are required. The addition of larger amounts of catalytically active compound is not injurious but does not lead to any further shortening of the reaction period.

The reaction mixture is worked up by conventional methods. The pigments are obtained in excellent yields, as a rule 90 to 98% of the theory.

Copper phthalocyanines obtainable according to the invention and given a conventional finish have greater purity, greater color strength and greater brilliance than products which have been obtained without the addition of the catalytically acting compounds.

The invention is illustrated by the following examples in which parts and percentages are by weight unless otherwise stated. Parts by volume bear the same relation to parts by weight as the liter to the kilogram.

*Example 1*

14.8 g. of cuprous chloride is suspended in 200 g. of nitrobenzene and ammonia is passed in while stirring until the solution is saturated. A green suspension forms and the temperature rises from 20° to 40° C.; 80 g. of anhydrous phthalodinitrile and 260 mg. of molybdic acid are added and the mixture is heated to 140° C. Most of the suspension passes into solution and the color changes from olive green through yellow to red brown. Reaction begins at 146° C. with the formation of copper phthalocyanine and the solution becomes very quickly thicker as the reaction proceeds. The temperature rises suddenly to the boiling point of the nitrobenzene. The mixture is heated at the boiling temperature for twenty minutes with vigorous stirring and the product is suction filtered while hot. The dye is washed with 200 ml. of hot nitrobenzene at about 100° C. and then with 300 ml. of methanol to remove the nitrobenzene. Finally the dye moist with methanol is digested for an hour in fifteen times the amount of water at about 95° C., suction filtered and dried. The yield is 97.2% of the theory. The dye is free from chlorine and free from ionic copper.

*Example 2*

The catalyst, copper salt, base and phthalodinitrile are varied in a standarized procedure hereinafter described for the purpose of explanation. The yields of the reaction which is stopped after a definite time indicate the advantage over a reaction carried out under the same conditions but without catalyst (a) g. of a copper salt is suspended in the solvent and (b) 1 or g. of a base is passed in or added the temperature rising by about 10° to 20° C. Then 70 g. of phthalodinitrile and (c) g. of catalyst are introduced. While stirring vigorously, the whole is heated within a few minutes to 120° C. so that most of the dinitrile passes into solution and a yellow intermediate compound is partly precipitated. The temperature of 120° C. is maintained for about ten minutes and the mixture is then very quickly heated until the strongly exothermic reaction begins with the formation of the dye. The temperature rises more or less quickly to the boiling point of the nitrobenzene depending on the experimental conditions.

Three minutes after the beginning of the exothermic reaction, the reaction is stopped by adding 150 ml. of cold nitrobenzene, the dye is suction filtered, immediately washed with hot nitrobenzene and then washed free from nitrobenzene with about 200 ml. of methanol; the crude product is digested twice each time with 1000 ml. of 0.1 N HCl at 90° C., suction filtered while hot and washed until neutral. After this purification procedure, the dye no longer contains any soluble impurities. The weight of the dried product thus obtained is given as the yield of the experiment.

Complete reaction of the phthalodinitrile can easily be achieved by prolonging the reaction period; the time required for the non-catalyzed reaction is a multiple of that according to this invention and in many cases the same high yields are not achieved.

(1) Varying the catalyst and the amount of catalyst: The standard mixture, with 300 g. of nitrobenzene, 14.8 g. of cuprous chloride, 70 g. of phthalodinitrile and saturation with ammonia gives the following yields:

| | g. |
|---|---|
| Without catalyst | 15.7 |
| 0.5 millimole of molybdic acid | 39.6 |
| 1 millimole of molybdic acid | 46.7 |
| 2 millimoles of molybdic acid | 46.9 |
| 1 millimole of molybdenum carbonyl | 44.8 |
| 1 millimole of iron carbonyl | 61.9 |
| 1 millimole of titanium tetrachloride | 42.4 |
| 1 millimole of phosphomolybdic acid | 32.8 |

(2) Varying the copper salt used and mixtures of different copper salts: the standard mixture, with 300 g. of nitrobenzene, 70 g. of phthalodinitrile, 260 mg. of molybdic acid and saturation with ammonia gives the following yields:

| | g. |
|---|---|
| 14.8 g. of cuprous chloride | 46.7 |
| 25.4 g. of cupric chloride | 50.1 |
| 7.4 g. of cuprous chloride and 12.7 g. of cupric chloride | 47.8 |
| 3.7 g. of cuprous chloride and 19.05 g. of cupric chloride | 52.1 |
| 11.1 g. of cuprous chloride and 6.35 g. of cupric chloride | 51.8 |

(3) Using different bases; the standard mixture, with 300 g. of nitrobenzene, 14.8 g. of cuprous chloride, 70 g. of phthalodinitrile and 260 mg. of molybdic acid gives the following yields:

| | g. |
|---|---|
| 6.7 liters $NH_3$ (with no catalyst added) | 15.7 |
| 6.7 liters of $NH_3$ | 46.7 |
| 3.3 liters of $NH_3$ | 58.3 |
| 20 g. of quinoline | 67.1 |
| 20 g. of pyridine | 71.3 |

*Example 3*

The use of substituted phthalodinitriles as starting compounds: a mixture of 200 parts of nitrobenzene, 26.6 parts of tetrachlorophthalodinitrile, 3 parts of copper (I) chloride and 0.5 part of molybdenum trioxide is saturated while cold with ammonia. It is then heated to boiling temperature and the mixture kept boiling under reflux for four minutes. The mixture is cooled within ten minutes to 135° C. and the product is suction filtered, washed free from nitrobenzene with methanol and dried at 100° C. The yield is 21.9 parts.

If the reaction is carried out under the stated conditions but without catalyst, the yield is only 9.6 parts.

*Example 4*

This example is given with reference to the accompanying drawing which shows diagrammatically an apparatus suitable for carrying out the process according to this invention.

2.56 kg. of phthalodinitrile is supplied continuously per hour through line A, 0.5 kg. per hour of cuprous chloride through line B, 0.01 kg. per hour of molybdic acid through line C and 8 kg. per hour of nitrobenzene through line D to a vessel 1 which is fitted with a stirrer. The nitrobenzene has a temperature of about 120° C. from the recycle operation. The suspension is kept at 140° C. and dry ammonia gas is introduced in excess through line E. The escaping ammonia is returned to the reaction through a recycle gas blower or a slight excess pressure of ammonia is maintained in the container. After a mean residence time of ten minutes in the stirred vessel, the mixture overflows into a reactor 2. The reactor 2 consists of two tubes, one inverted in the other. The mixture flows into the inner tube 2a where conversion to the dye takes place immediately in an exothermic reaction at 175° to 190° C. The dye suspension is forced from the inner tube into the outer tube 2b by a double anchor stirrer and the dye suspension is removed through a screw discharge 3. As a rule a residence time of thirty minutes in the reactor is sufficient. The discharged dye is filtered and washed with 2.5 kg. per hour of fresh nitrobenzene at about 140° C. supplied through line F. The amount of nitrobenzene used for washing is equivalent to the amount of solvent retained in the filter cake. The mother liquor is returned through line G to the vessel 1 as far as possible without loss of heat. The filter cake, discharged into the receptable H, is worked up in the conventional way.

The yield is 2.6 kg. of copper phthalocyanine per hour.

We claim:

1. A process for the production of a copper phthalocyanine which comprises reacting a compound selected from the group consisting of phthalodinitrile, 4-phenylphthalodinitrile and phthalodinitrile bearing from one to four chlorine or bromine substituents at a temperature between about 120° C. and 220° C. with a copper salt selected from the group consisting of copper sulfate, copper acetate, copper (I) chloride, copper (II) chloride and mixtures thereof in an organic solvent selected from the group consisting of nitrobenzene, monochlorobenzene, trichlorobenzene, octyl alcohol, nonyl alcohol, dodecyl alcohol, pyridine and quinoline and in the presence of a nitrogeneous compound selected from the group consisting of ammonia, pyridine and quinoline and further in the presence of a catalyst selected from the group consisting of molybdenum oxide, molybdenum carbonyl, iron carbonyl, titanium tetrachloride, phosphomolybdic acid and molybdic acid.

2. A process as claimed in claim 1 wherein the phthalodinitrile.

3. A process as claimed in claim 1 wherein the phthalodinitrile used is tetrachlorophthalodinitrile.

4. A process as claimed in claim 1 wherein said catalyst is molybdenum oxide.

5. A process as claimed in claim 1 wherein said catalyst is molybdenum carbonyl.

6. A process as claimed in claim 1 wherein said catalyst is iron carbonyl.

7. A process as claimed in claim 1 wherein said catalyst is titanium tetrachloride.

8. A process as claimed in claim 1 wherein said catalyst is phosphomolybdic acid.

9. A process as claimed in claim 1 wherein said catalyst is molybdic acid.

10. A process as claimed in claim 1 wherein said reaction is carried out in nitrobenzene as an organic solvent which is inert under the reaction conditions.

References Cited

UNITED STATES PATENTS 3,300,512   1/1967   Gerson et al. _____ 260—314.5

HENRY R. JILES, *Primary Examiner.*

H. I. MOATZ, *Assistant Examiner.*